US009362578B2

(12) United States Patent
Patterson et al.

(10) Patent No.: US 9,362,578 B2
(45) Date of Patent: Jun. 7, 2016

(54) FUEL CELL POWER PLANT OPERATING SYSTEM AND METHOD FOR USE IN SUB-FREEZING AMBIENT CONDITIONS

(75) Inventors: Timothy Patterson, West Hartford, CT (US); Paravastu Badrinarayanan, Manchester, CT (US)

(73) Assignee: Audi AG, Ingolstadt (DE)

( * ) Notice: Subject to any disclaimer, the term of this patent is extended or adjusted under 35 U.S.C. 154(b) by 335 days.

(21) Appl. No.: 13/884,039

(22) PCT Filed: Dec. 7, 2010

(86) PCT No.: PCT/US2010/003098
§ 371 (c)(1),
(2), (4) Date: May 8, 2013

(87) PCT Pub. No.: WO2012/078123
PCT Pub. Date: Jun. 14, 2012

(65) Prior Publication Data
US 2013/0252123 A1   Sep. 26, 2013

(51) Int. Cl.
*H01M 8/04*   (2006.01)
(52) U.S. Cl.
CPC ........ *H01M 8/04253* (2013.01); *H01M 8/0432* (2013.01); *H01M 8/04753* (2013.01); *H01M 2250/40* (2013.01); *Y02E 60/50* (2013.01); *Y02E 60/56* (2013.01)
(58) Field of Classification Search
None
See application file for complete search history.

(56) References Cited

U.S. PATENT DOCUMENTS

| 2002/0009623 A1* | 1/2002 | St-Pierre | H01M 8/04007 |
| | | | 429/414 |
| 2004/0224191 A1* | 11/2004 | Skiba | H01M 8/04223 |
| | | | 429/414 |
| 2005/0053807 A1 | 3/2005 | Breault et al. | |
| 2005/0058865 A1* | 3/2005 | Thompson | H01M 8/0258 |
| | | | 429/429 |
| 2005/0238934 A1 | 10/2005 | Takahashi | |
| 2007/0087238 A1* | 4/2007 | Inai | H01M 8/04007 |
| | | | 429/414 |

(Continued)

FOREIGN PATENT DOCUMENTS

| JP | 5-184063 A | 7/1993 |
| JP | 11-214025 A | 8/1999 |

(Continued)

OTHER PUBLICATIONS

Aso, Vehicle loaded with fuel cell, JP2008-109767, Abstract English translation, May 8, 2008.*

(Continued)

*Primary Examiner* — Patrick Ryan
*Assistant Examiner* — Jose Colucci Rios
(74) *Attorney, Agent, or Firm* — Seed IP Law Group PLLC

(57) ABSTRACT

The fuel cell power plant operating system (10) includes an on/off switching device by-pass circuit (60) to sustain operation of a fuel cell (12) whenever the fuel cell (12) on/off switching device (58) is turned off while a fuel cell operating temperature is below a predetermined freeze-safe operating temperature. The by-pass circuit (60) operates the fuel cell (12) until the fuel cell (12) temperature reaches or exceeds the freeze-safe temperature to thereby prevent fuel cell (12) product water from becoming ice in and adjacent fuel cell catalysts (26, 40).

13 Claims, 2 Drawing Sheets

(56) References Cited

U.S. PATENT DOCUMENTS

| | | | |
|---|---|---|---|
| 2007/0292724 A1* | 12/2007 | Gilchrist | H01M 8/04268 429/9 |
| 2008/0081224 A1* | 4/2008 | Burch | H01M 8/04007 429/429 |
| 2008/0090111 A1* | 4/2008 | Kim | H01M 8/04007 429/429 |
| 2008/0233437 A1* | 9/2008 | Muramatsu | H01M 8/04194 429/410 |
| 2010/0291446 A1* | 11/2010 | Aso | B60L 11/1887 429/429 |

FOREIGN PATENT DOCUMENTS

| | | |
|---|---|---|
| JP | 2005-71935 A | 3/2005 |
| JP | 2005-259494 A | 9/2005 |
| JP | 2008-109767 A | 5/2008 |
| JP | 2009-135077 A | 6/2009 |

OTHER PUBLICATIONS

International Search Report, mailed Sep. 28, 2011, for International Application No. PCT/US2010/003098, 3 pages.

* cited by examiner

FUEL CELL POWER PLANT OPERATING SYSTEM AND METHOD FOR USE IN SUB-FREEZING AMBIENT CONDITIONS

TECHNICAL FIELD

The present invention relates to fuel cells that are suited for usage in transportation vehicles, portable power plants, or as stationary power plants, and the invention especially relates to a fuel cell power plant operating system to minimize problems associated with freezing of fuel cell water.

BACKGROUND ART

Fuel cells are well known and are commonly used to produce electrical power from hydrogen containing reducing fluid fuel and oxygen containing oxidant reactant streams to power electrical apparatus such as generators and transportation vehicles. In fuel cells of the prior art, it is known to utilize a proton exchange membrane ("PEM") as the electrolyte. As is well known, protons formed at an anode catalyst layer move through the electrolyte to a cathode catalyst layer while electrons move through a circuit to power a load. Fuel cell product water is formed at the cathode catalyst as the electrons complete the circuit back to the fuel cell and as an oxidant passes adjacent the cathode catalyst.

Use of such fuel cells to power transportation vehicles necessarily involves many start-stop cycles, some of which will occur in sub-freezing ambient conditions. Typically, fuel cell product water in a PEM fuel cell is at least partially recycled or utilized to hydrate membranes, to humidify reactant streams, to remove heat from a membrane electrode assembly ("MEA"), to support fuel reformers, and for other well-known purposes. In sub-freezing ambient conditions, freezing of fuel cell water may block flow paths that direct reactant streams through the fuel cell, thereby disrupting fuel cell performance.

Efforts to minimize problems of freezing of fuel cell product water include use of complicated and costly fuel fired heaters, electrical heaters using parasitic power from a fuel cell power plant battery, complex antifreeze solutions within coolant water flow streams, etc. It is also known to rely exclusively upon heat generated by an operating fuel cell upon start-up of the fuel cell to prevent fuel cell product water from freezing and blocking reactant stream flow channels. Such a start-up is frequently referred to as a "boot strap start-up", because the fuel cell itself provides its own heat for preventing freezing of fuel cell product water produced during the start-up.

Unfortunately, however, when ambient conditions are extremely cold, or when a fuel cell is only operated for a short duration in sub-freezing ambient conditions (such as a two-three minute or shorter operation of a vehicle), fuel cell product water generated upon start-up may remain at sub-freezing conditions within pores of the cathode catalyst layer and within reactant flow pores or channels adjacent the cathode and/or anode catalyst layer. Such sub-freezing fuel cell water may then freeze and block or limit access of gaseous reactant streams to fuel cell catalysts. This is an especially troublesome problem if a fuel cell powered vehicle experiences one or more aborted starts, which means an operator initiates a fuel cell shut down, typically by turning off a fuel cell on/off switching device during a fuel cell start-up process prior to the fuel cell achieving a freeze-safe operating temperature. This may occur for a variety of reasons typical of normal vehicle operating circumstances, such as an operator returning into a residence to get a forgotten item, very short trips, such as to a neighbor's residence, etc. The frozen fuel cell water may then substantially impede subsequent efforts at starting up the fuel cell in the sub-freezing ambient conditions by prohibiting and/or severely restricting flow of reactant streams adjacent the fuel cell catalysts, especially adjacent a cathode catalyst. The key point or main problem is that a power plant shut down signal is sent to the power plant controller when the power plant is in no condition to shut down due to its operating environment.

SUMMARY

The disclosure is a fuel cell power plant operating system for starting up a fuel cell in sub-freezing ambient conditions. The system includes a fuel cell for directing oxidant and fuel reactant streams through the fuel cell to generate an electric current and to provide the electric current through a load circuit to a primary load. A system controller controls operation of the fuel cell and communicates control signals to an operating circuit that is secured in communication with and between the system controller and the fuel cell for controlling operation of the fuel cell including by controlling flow of the reactant streams through the fuel cell. A temperature sensor is secured to the fuel cell for sensing temperatures adjacent an electrolyte of the fuel cell and the temperature sensor communicates the sensed temperatures to the system controller. An on/off switching device is secured in communication with and between the system controller and the operating circuit and selectively permits the operating circuit to operate the fuel cell. An on/off switching device by-pass circuit is secured in communication with and between the system controller and the operating circuit for selectively permitting the operating circuit to operate the fuel cell as the on/off switching device is turned off and the temperature sensor senses a fuel cell temperature below a predetermined freeze-safe operating temperature. For purposes herein, the phrase "on/off switching device" is to mean any switching device, signal, communication device or method capable of communicating instructions to the system controller to selectively start up and shut down the fuel cell.

By permitting operation of the fuel cell, the on/off switching device by-pass circuit allows the fuel cell to generate adequate heat to keep the fuel cell water within and adjacent the fuel cell catalyst layers in liquid form until the fuel cell temperature achieves the predetermined freeze-safe operating temperature. At that temperature, the fuel cell will have achieved an acceptable balance of liquid and gaseous fuel cell product water. The increased temperature will aid evaporation of liquid water from and adjacent the cathode catalyst and the water vapor will then move with the oxidant reactant stream out of the fuel cell. Simultaneously, the increased fuel cell temperature will melt fuel cell water frozen within pores of gas diffusion layers that diffuse flow of reactant streams adjacent the catalysts.

At the freeze-safe operating temperature, the fuel cell may be shut down without formation of unacceptable levels of disruptive ice within pores of the catalyst layer and/or within adjacent reactant flow paths. Fuel cell electric current produced during the on/off switching device by-pass circuit controlled operation of the fuel cell may be directed through the by-pass circuit to an auxiliary load, such as a fuel cell battery, heater, or simply a resistive load such as a heat sink, etc., instead of to the primary load (e.g., the vehicle motor).

Accordingly, it is a general purpose of the present disclosure to provide a fuel cell power plant operating system and method for use in sub-freezing ambient conditions that overcomes deficiencies of the prior art.

It is a more specific purpose to provide a fuel cell power plant operating system and method for use in sub-freezing ambient conditions that minimizes problems associated with freezing of fuel cell product water during a fuel cell power plant start-up process and subsequent fuel cell power plant operation.

These and other purposes and advantages of the present disclosure will become more readily apparent when the following description is read in conjunction with the accompanying drawings.

DESCRIPTION OF THE PREFERRED EMBODIMENTS

Figure 1:
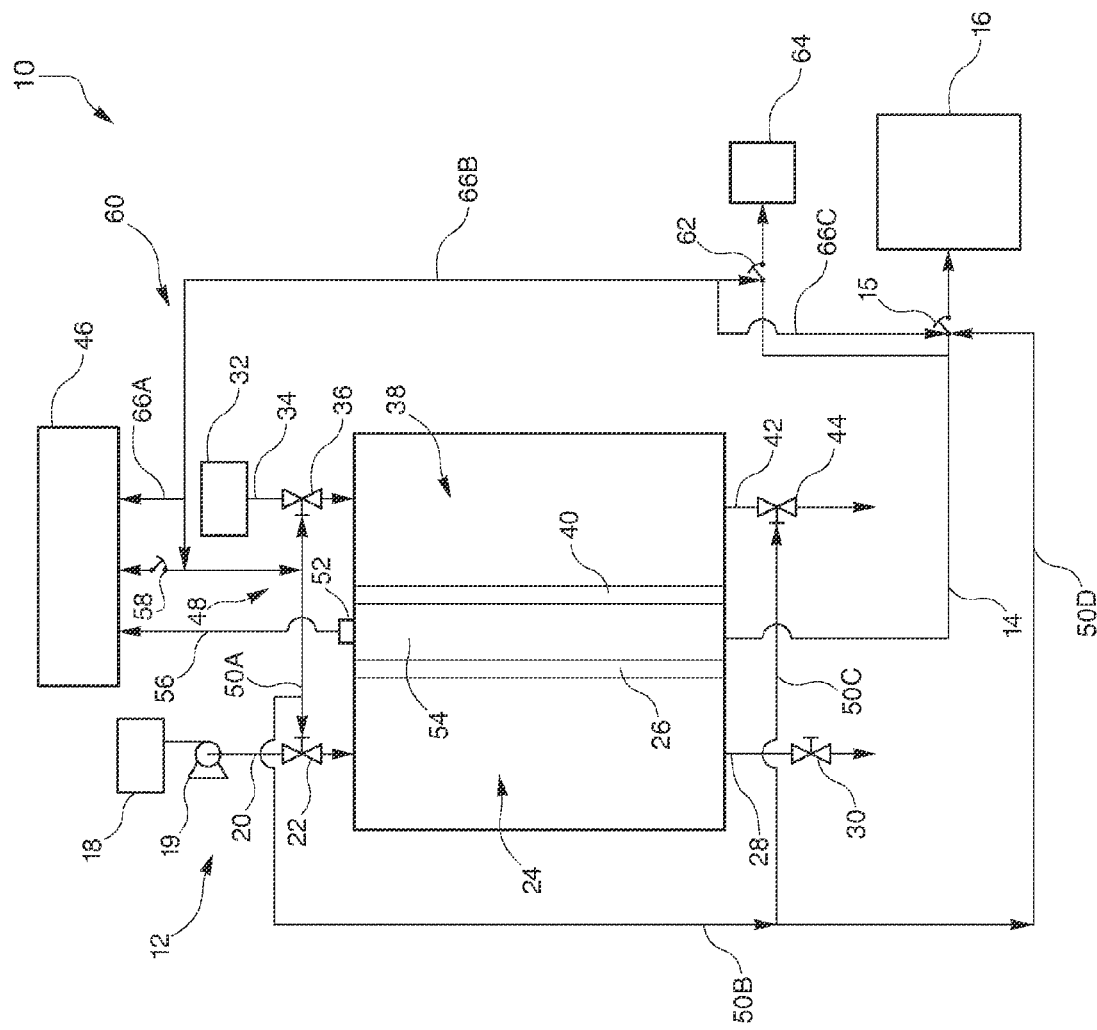
FIG. 1 is a simplified schematic representation of a fuel cell power plant operating system and method for use in sub-freezing ambient conditions constructed in accordance with the present disclosure.

Referring to the drawing in detail, a simplified schematic representation of a fuel cell power plant operating system for operating the power plant in sub-freezing ambient conditions is shown in FIG. 1, and is generally designated by the reference numeral 10. The fuel cell power plant system 10 includes a fuel cell 12 for directing oxidant and fuel reactant streams through the fuel cell 12 to generate an electric current and to provide the electric current through a load circuit 14 and primary load switching device 15 to a primary load 16, such as an electric motor. The fuel cell 12 includes an oxidant source 18 for storing and directing the oxidant reactant stream through an oxidant blower 19 secured to an oxidant inlet line 20 and an oxidant inlet valve 22 into a cathode flow field 24 for directing the oxidant reactant stream to pass adjacent a cathode catalyst 26 and out of the cathode flow field 24 through a cathode exhaust line 28 and cathode exhaust valve 30 secured to the line 28. The fuel cell 12 also includes a fuel source 32 for storing and directing the hydrogen rich reactant stream through a fuel inlet line 34 and a fuel inlet valve 36 into an anode flow field 38 for directing the hydrogen reactant stream to pass adjacent an anode catalyst 40 and out of the anode flow field 38 through an anode exhaust line 42 and anode exhaust valve 44 secured to the line 42.

A system controller 46 controls operation of the fuel cell 12 and may be any controller means known and capable of performing system control functions as described herein, such as a computer, a microcomputer, electro-mechanical valves and switching devices operated by a human operator, computer-generated control signals transmitted to valves and switching devices, etc. The system controller 46 communicates control signals to an operating circuit 48 that is secured in communication with and between the system controller 46 and the fuel cell 12 for controlling operation of the fuel cell 12 including by controlling flow of the reactant streams through the fuel cell inlet valves 22, 36 and exhaust valves 30, 44 and by controlling the primary load switching device 15. The operating circuit 48 is shown schematically in FIG. 1 as operating lines 50A, 503, 50C and 50D extending between the system controller 46 and the valves 22, 30, 36, 44 and the primary load switching device 15 for efficiency of explanation. However, the operating circuit 48 may be much more complex involving known circuit control apparatus activated by any form of signal communication means for controlling valves and switching devices, and may include many intermediary and ancillary apparatus not necessary for explanation of this disclosure but necessary for efficient operation of the fuel cell 12.

A temperature sensor 52 is secured to the fuel cell 12 for sensing temperatures adjacent an electrolyte 54 of the fuel cell 12, and for communicating the sensed temperatures to the system controller 46 such as through a temperature line 56. An on/off switching device 58 is secured in communication with and between the system controller 46 and the operating circuit 48 and selectively permits the operating circuit 48 to operate the fuel cell 12, as described above. (By the phrase "selectively permits", it is meant that the on/off switching device 58 may be selected by an operator (not shown) or the system controller 46 from an "on" position (switching device closed) to permit operation of the control circuit 48, or an "off" position (switching device open) to terminate operation of the fuel cell 12.)

An on/off switching device by-pass circuit 60 is secured in communication with and between the system controller 46 and the operating circuit 48. In response to the sensed temperatures received from the temperature sensor 52, the system controller 46 selectively permits the on/off switching device by-pass circuit 60 to by-pass the on/off switching device 58 to thereby permit the operating circuit 48 to operate the fuel cell 12 as the on/off switching device 58 is turned off and the temperature sensor 52 senses that the fuel cell 12 temperature is below a predetermined freeze-safe operating temperature. By the phrase "predetermined freeze-safe operating temperature", it is meant that a particular temperature is determined for each particular fuel cell at and above which formation of ice upon shutdown of the fuel cell results in no or minimal problems. The on/off switching device by-pass circuit 60 is also secured with and between the system controller 46, operating circuit 48, the primary load switching device 15 and an auxiliary load switching device 62. The by-pass circuit 60 is configured to turn off (open) the primary load switching device 15 and simultaneously turn on (close) the auxiliary load switching device 62 so that electrical current generated during use of the by-pass circuit 60 is directed to an auxiliary load 64 rather than the primary load 16. The auxiliary load 64 may be a battery and/or capacitor, heating circuit, resistive load or other such loads.

The on/off by-pass circuit 60 is shown schematically in FIG. 1 as a plurality of communication lines 66A, 66B and 66C (e.g. electrical lines, transmission pathways, etc.) extending between the system controller 46, the operating circuit 48, primary load switching device 15 and auxiliary load switching device 62. However, the by-pass circuit 60 may also include any signal communication apparatus capable of performing the described functions.

While the on/off switching device 58, control circuit 48 and by-pass circuit 60 are shown as separate from the system controller 46, it is meant by this description that the switching device 58, control circuit 48 and by-pass circuit 60 have separate functions. It is possible that the on/off switching device 58, control circuit lines 50A, 50B, 50C, 50D, by-pass circuit 60 and by-pass circuit lines 66A, 66B, 66C may be physically integrated within the system controller 46 in a variety of cooperating structures and are only separated by the functions described herein for each component.

Figure 2:
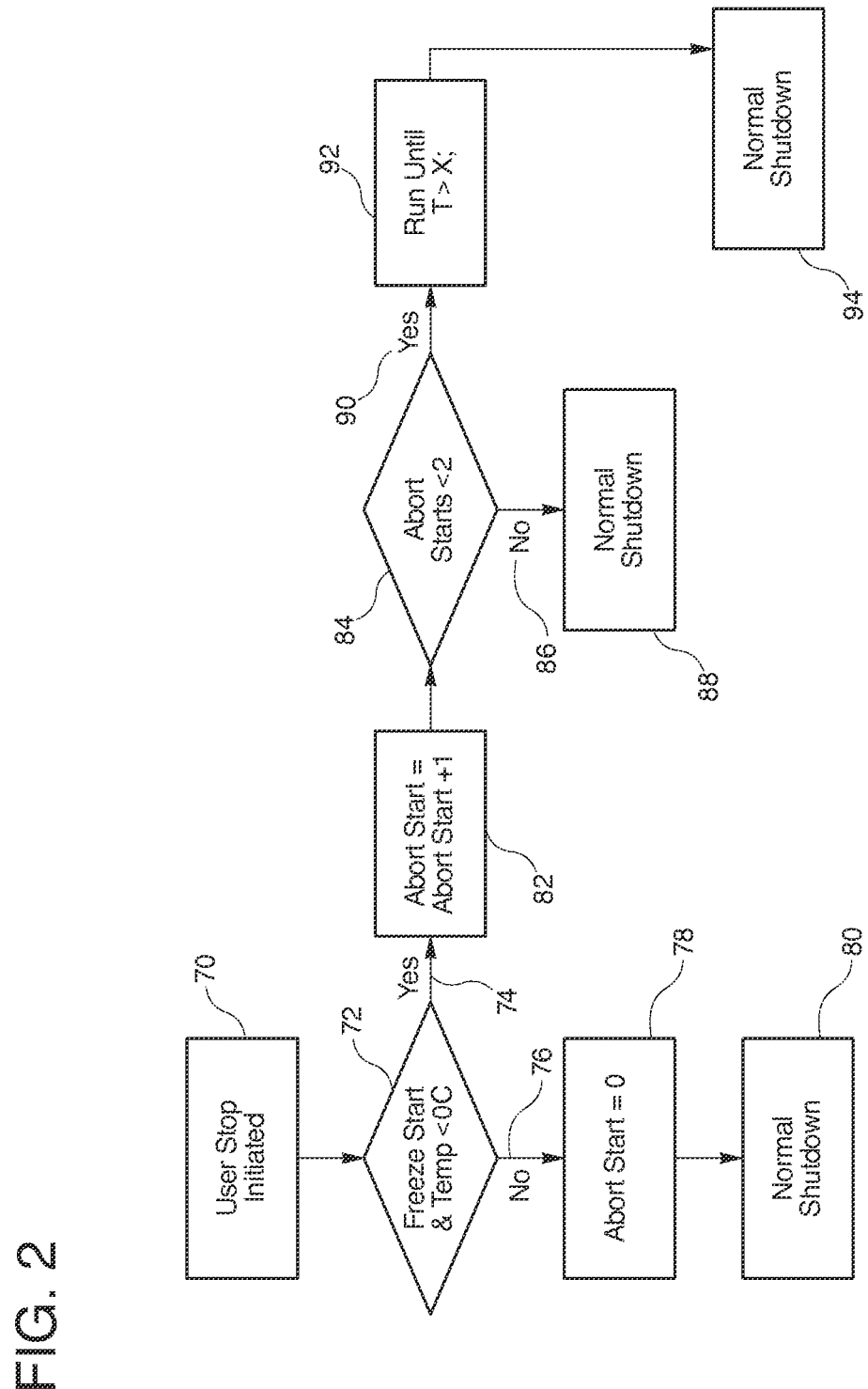
FIG. 2 is a decision flow chart representing a fuel cell power plant operating method for use in sub-freezing ambient conditions in accordance with the present invention.

FIG. 2 shows a decision flow chart that efficiently explains operation of the fuel cell power plant operating system 10 of the present disclosure. For a fuel cell 12 that would be one of a plurality of interconnected fuel cells within a fuel cell stack (not shown) of a fuel cell power plant (not shown) powering a transportation vehicle (not shown), actions and decisions shown in FIG. 2 commence with a vehicle operator or user initiated stop 70 of the vehicle, such as by turning off (opening) the on/off switching device 58. When the user initiates a shutdown, (switching device-off), the controller 46 decides, as shown in decision box 72 whether an aborted freeze start has occurred. An aborted freeze start is defined to occur when the internal temperature of the fuel cell is below 0° C. upon a user-initiated start (switching device-on) of the vehicle and the fuel cell 12 internal temperature has not increased above the freeze-safe operating temperature at the time of the user-initiated stop (switching device-off). If an aborted freeze start was determined not to have occurred, then an abort start counter of the system controller 46 is reset to zero as shown in box 78 of FIG. 2, and the controller 46 proceeds with a fuel cell 12 power plant normal shutdown procedure, as shown in box 80 of FIG. 2. If an aborted freeze start was determined to occur, as shown by the "Yes" at reference 74 in FIG. 2, then the system controller 46 decides whether the number of aborted freeze starts exceeds a predetermined limit, as shown in box 82 and decision box 84. If the number of aborted freeze starts is less than or equal to the predetermined limit, then the number of aborted freeze starts is incremented by 1 and the controller 46 shuts down the fuel cell 12 normally, as shown by the "No" decision at reference 86 and the "normal shutdown" box 88. If the number of aborted freeze starts exceeds a predetermined limit as shown by the "Yes" decision at reference 90, then the controller initiates the fuel cell warm-up procedure, as indicated in reference 92.

By the phrase "abort freeze start", "abort start", or "aborted freeze starts", it is not meant that the fuel cell 12 failed to start. Instead, an aborted freeze start means that a fuel cell user turns off the fuel cell on/off switching device 58 after a start in subfreezing ambient conditions and prior to the fuel cell achieving a predetermined freeze-safe operating temperature. For example, such an aborted start may occur in extremely cold ambient conditions wherein the vehicle makes a very short trip of less than a few hundred meters.

In the fuel cell warm-up procedure, the system controller 46 will engage the on/off switching device by-pass circuit 60 to keep the oxidant and fuel reactant streams flowing through the fuel cell 12 while the by-pass circuit 60 turns off (opens) the primary load switching device 15 and turns on (closes) the auxiliary load switching device 62. The fuel cell 12 will then operate or run until the temperature sensor 52 senses that the fuel cell 12 temperature exceeds the predetermined freeze-safe operating temperature "X", as shown in box 92 of FIG. 2.

The system controller 46 will then control the fuel cell 12 to proceed through a normal shutdown procedure, as shown in box 94 of FIG. 2. Such a "normal shutdown" may include a variety of steps and/or processes depending upon design of the fuel cell 12, operating environment of the fuel cell 12, and ambient conditions, etc. For example, the oxidant blower 19 may be controlled by the system controller 46 to operate at varying flow rates and for varying durations depending upon such factors. Furthermore, the operation of the fuel cell 12 by the system controller 46 through the on/off switching device by-pass circuit 60 may be controlled to operate the fuel cell 12 at a useful voltage (e.g., greater than 0.6 volts), or the oxidant blower 19 may be controlled to operate at a lowest speed to produce a virtual oxidant starvation mode while letting the voltage drop to about 0.0 volts. Power for this operation of the fuel cell 12, may come from auxiliary load 64 batteries, etc.

Consequently, an efficient method of starting up the fuel cell 12 in sub-freezing ambient conditions includes starting up the fuel cell 12 by turning on the on/off switching device 58 so that oxidant and fuel reactant streams flow through the fuel cell 12 to produce an electric current for a primary load 16; turning the on/off switching device 58 off while the fuel cell 12 has a temperature adjacent the fuel cell electrolyte 54 that is below a predetermined freeze-safe operating temperature; and, controlling the fuel cell 12 to continue operating until the fuel cell 12 temperature adjacent the electrolyte 54 is above the predetermined freeze-safe operating temperature while the on/off switching device 58 is turned off. The method may also include, after turning off the on/off switching device 58, directing the electric current from the primary load 16 to an auxiliary load 64, as well as only controlling the fuel cell 12 to continue operating after a first aborted start 84, as shown in FIG. 2.

As described above, when the fuel cell 12 increases in temperature to the freeze-safe operating temperature "X", the fuel cell 12 will have achieved an acceptable and stable operating balance of liquid and gaseous water so that the fuel cell 12 may then be shut down without formation of unacceptable levels of disruptive ice within pores of the cathode catalyst 26 and/or the anode catalyst 40 and within the adjacent cathode flow field 24 and anode flow field 38 and associated reactant stream flow paths. By permitting operation of the fuel cell 12, the on/off switching device by-pass circuit 60 allows the fuel cell 12 to generate adequate heat to keep the fuel cell 12 water within and adjacent the fuel cell catalysts in liquid form until the fuel cell 12 temperature achieves the predetermined freeze-safe operating temperature "x". The increased temperature will aid evaporation of liquid water from and adjacent the cathode catalyst 26 in particular, and the water vapor will then move with the oxidant reactant stream out of the fuel cell 12 so that the fuel cell 12 may undergo a normal and safe shutdown.

While the present disclosure has been described with respect to the illustrated fuel cell 12 power plant operating system 10 and method for use in sub-freezing ambient conditions, it is to be understood that the invention is not to be limited to those embodiments. For example, while the fuel cell 12 is shown for purposes of explanation as a single cell 12, it is to be understood that the use of the fuel cell 12 is more likely to be within a variety of adjacent fuel cells (not shown) arranged with cooperative manifolds, etc., in a well know fuel cell stack assembly (not shown). Accordingly, reference should be made primarily to the following claims rather than the foregoing description to determine the scope of the invention.

What is claimed is:

1. A fuel cell power plant operating system, the system comprising:
    a fuel cell being configured to direct oxidant and fuel reactant streams through the fuel cell to generate an electric current and to provide the electric current through a load circuit to a primary load during operation of the fuel cell;
    a temperature sensor configured to sense a fuel cell temperature;
    a system controller secured in communication with the fuel cell and configured to maintain operation of the fuel cell as an on/off switching device instructs the system controller to shut down the fuel cell in response to the fuel cell temperature being below a predetermined freeze-safe operating temperature; and
    an auxiliary load secured in electric communication with the fuel cell and secured in communication with the system controller so that the fuel cell generated electric current is directed from the primary load to the auxiliary load in response to the fuel cell temperature being below the predetermined freeze-safe operating temperature.

2. A fuel cell power plant operating system, the system comprising:
a fuel cell being configured for directing oxidant and fuel reactant streams through the fuel cell to generate an electric current and to provide the electric current through a load circuit to a primary load during operation of the fuel cell;
a system controller secured in communication with the fuel cell for controlling operation of the fuel cell;
an operating circuit secured in communication with and between the system controller and the fuel cell for controlling operation of the fuel cell including by controlling flow of the oxidant and fuel reactant streams through the fuel cell in response to control signals received from the system controller;
a temperature sensor secured to the fuel cell for sensing temperatures of the fuel cell and for communicating the sensed temperatures to the system controller;
an on/off switching device secured in communication with and between the system controller and the operating circuit for selectively permitting the operating circuit to operate the fuel cell;
an on/off switching device by-pass circuit secured in communication with and between the system controller and the operating circuit for selectively permitting operation of the fuel cell as the on/off switching device is turned off and the temperature sensor senses a fuel cell temperature below a predetermined freeze-safe operating temperature; and
an auxiliary load secured in electric communication through an auxiliary load switching device with the fuel cell and secured in communication with the system controller so that the fuel cell generated electric current is directed from the primary load to the auxiliary load whenever the system controller maintains operation of the fuel cell as the on/off switching device instructs the system controller to shut down the fuel cell and as the temperature sensor senses the fuel cell temperature is below the predetermined freeze-safe operating temperature.

3. A method of operating a fuel cell power plant system sub-freezing ambient conditions, the method comprising:
starting up a fuel cell by turning an on/off switching device to an on position, the starting up including:
producing an electric current by directing oxidant and fuel reactant streams through the fuel cell; and
directing the electric current to a primary load;
determining a temperature of the fuel cell adjacent to a fuel cell electrolyte;
performing a first aborted freeze start by turning the on/off switching device to an off position in response to the temperature adjacent to the fuel cell electrolyte being below a predetermined freeze-safe operating temperature, the performing including:
maintaining the directing of the oxidant and fuel reactant streams through the cell; and
directing the electric current from the primary load to an auxiliary load after turning the on/off switching device to the off position; and
maintaining the on/off switching device in the off position until the temperature adjacent to the fuel cell electrolyte is above the predetermined freeze-safe operating temperature.

4. The method of claim 3, further comprising;
performing a second aborted freeze start by turning the on/off switching device to the on position then turning the on/off switching device to the off position, the temperature adjacent to the fuel cell electrolyte being below the predetermined freeze-safe operating temperature, and maintaining the on/off switching device in the off position until the temperature adjacent to the fuel cell electrolyte is above the predetermined freeze-safe operating temperature.

5. The system of claim 1 wherein the temperature sensor is secured proximal to an electrolyte of the fuel cell.

6. The system of claim 1, further comprising:
a by-pass circuit operably coupled to the system controller, the by-pass circuit directing the fuel cell generated electric current from the primary load to the auxiliary load.

7. The system of claim 1 wherein the auxiliary load includes at least one of a battery, a capacitor, a heating circuit, and a resistive load.

8. The method of claim 3, further comprising:
defining a predetermined limit for aborted freeze starts before which the first aborted freeze start is initiated; and
initiating the first aborted freeze start after the predetermined limit for aborted freeze starts is exceeded.

9. A fuel cell power plant operating system comprising:
a fuel cell configured to direct oxidant and fuel reactant streams through the fuel cell to generate an electric current and to provide the electric current to a primary load during operation of the fuel cell;
a system controller operably coupled to the fuel cell;
an operating circuit operably coupled to the system controller and the fuel cell;
an on/off switching device operably coupled to the system controller and the operating circuit, the on/off switching device selectively permitting operation of the fuel cell;
a temperature sensor secured to the fuel cell and operably coupled to the system controller, the temperature sensor configured to sense a fuel cell temperature and communicate the sensed fuel cell temperature to the system controller;
a by-pass circuit operably coupled to the system controller, the fuel cell, and the operating circuit; and
an auxiliary load operably coupled to the fuel cell and the system controller, the system controller configured to switch the on/off switching device off and direct the electric current generated from the primary load to the auxiliary load through the by-pass circuit in response to the fuel cell temperature being below a predetermined freeze-safe operating temperature.

10. The fuel cell power plant operating system of claim 9 wherein the temperature sensor is secured proximal to an electrolyte of the fuel cell.

11. The fuel cell power plant operating system of claim 9 wherein the auxiliary load includes at least one of a battery, a capacitor, a heating circuit, and a resistive load.

12. The fuel cell power plant operating system of claim 9 wherein, in response to the fuel cell temperature being below the predetermined freeze-safe operating temperature, the system controller is configured to allow the oxidant and fuel reactant streams to flow to the fuel cell.

13. The fuel cell power plant operating system of claim 9 wherein the system controller is configured to direct the electric current generated from the primary load to the auxiliary load when a predetermined limit of aborted freeze starts is exceeded.

* * * * *